United States Patent
Choi et al.

(10) Patent No.: US 11,001,766 B2
(45) Date of Patent: May 11, 2021

(54) PRODUCTION OF HIGH QUALITY DIESEL BY SUPERCRITICAL WATER PROCESS

(71) Applicant: Saudi Arabian Oil Company, Dhahran (SA)

(72) Inventors: Ki-Hyouk Choi, Dhahran (SA); Vinod Ramaseshan, Ras Tanura (SA); Mohnnad H. Alabsi, Dammam (SA)

(73) Assignee: SAUDI ARABIAN OIL COMPANY

( * ) Notice: Subject to any disclaimer, the term of this patent is extended or adjusted under 35 U.S.C. 154(b) by 143 days.

(21) Appl. No.: 15/896,718

(22) Filed: Feb. 14, 2018

(65) Prior Publication Data
US 2019/0249093 A1 Aug. 15, 2019

(51) Int. Cl.
*C10G 53/00* (2006.01)
*C10G 53/04* (2006.01)
(Continued)

(52) U.S. Cl.
CPC ............ *C10G 53/04* (2013.01); *B01D 3/10* (2013.01); *B01D 3/14* (2013.01); *B01D 11/0203* (2013.01);
(Continued)

(58) Field of Classification Search
CPC ........ C10G 53/02; C10G 55/00; C10G 55/02; C10G 55/04; C10G 67/02; C10G 69/02; C10G 69/06; C10G 9/007; B01J 3/008
See application file for complete search history.

(56) References Cited

U.S. PATENT DOCUMENTS 4,192,734 A * 3/1980 Pavlica ................. C10G 69/00 208/80
6,702,935 B2 3/2004 Cash et al.
(Continued)

FOREIGN PATENT DOCUMENTS

WO 2015108883 A1 7/2015
WO 2016071776 A2 5/2016

OTHER PUBLICATIONS

Luigi Valagussa, Clean Diesel Project, A process review, including the improvement of atmospheric and vacuum distillation columns for the reformulation of the diesel pool, PTQ, Q1 2011. (Year: 2011).*
International Search Report and Written Opinion for related PCT application PCT/US2019/017819 dated Apr. 9, 2019.

*Primary Examiner* — Prem C Singh
*Assistant Examiner* — Brandi M Doyle
(74) *Attorney, Agent, or Firm* — Bracewell LLP; Constance R. Rhebergen

(57) ABSTRACT

A method for producing a diesel having improved cold flow properties, the method comprising the steps of introducing a crude oil to a distillation column, separating the crude oil in the distillation unit to produce a light gas oil, and a light vacuum gas oil, where the light gas oil has a T95% cut point in the range between 300 deg C. and 340 deg C., where the light vacuum gas oil has a T95% cut point in the range between 400 deg C. and 430 deg C., processing the light vacuum gas oil in the supercritical water unit to produce an upgraded vacuum gas oil, separating the upgraded vacuum gas oil in the fractionator to produce an upgraded light fraction, an upgraded light gas oil, and upgraded heavy fraction, introducing the upgraded light gas oil into a diesel pool, and blending the light gas oil into the diesel pool.

20 Claims, 6 Drawing Sheets

(51) Int. Cl.

| | |
|---|---|
| *C10G 7/06* | (2006.01) |
| *B01D 11/02* | (2006.01) |
| *B01D 3/10* | (2006.01) |
| *B01D 3/14* | (2006.01) |
| *C10L 1/08* | (2006.01) |
| *C10G 9/34* | (2006.01) |
| *C10G 31/08* | (2006.01) |

(52) U.S. Cl.
CPC ............... *C10G 7/06* (2013.01); *C10G 9/34* (2013.01); *C10G 31/08* (2013.01); *C10L 1/08* (2013.01); *C10G 2300/1059* (2013.01); *C10G 2300/1074* (2013.01); *C10G 2400/04* (2013.01)

(56) References Cited

U.S. PATENT DOCUMENTS

| | | |
|---|---|---|
| 7,938,953 B2 | 5/2011 | Colyar et al. |
| 8,916,043 B2 | 12/2014 | Charon et al. |
| 2004/0050753 A1 | 3/2004 | Marion et al. |
| 2009/0159498 A1 | 6/2009 | Chinn et al. |
| 2014/0109465 A1 | 4/2014 | Coppola et al. |
| 2015/0203768 A1 | 7/2015 | Coppola et al. |
| 2016/0145499 A1* | 5/2016 | Choi .................. C10G 1/002 585/650 |
| 2016/0160130 A1 | 6/2016 | Martin |

* cited by examiner

PRODUCTION OF HIGH QUALITY DIESEL BY SUPERCRITICAL WATER PROCESS

TECHNICAL FIELD

Disclosed are methods for producing diesel. Specifically, disclosed are methods and systems for producing diesel with enhanced cold flow properties.

BACKGROUND

Wax components in diesel start to solidify and form crystals at temperatures below the cloud point temperature. The cloud point temperature can depend on the location, season, and grade of diesel fuel, ranging from 10 degrees Celsius (deg C.) and −33 deg C. The solidified wax components, typically in the saturates or paraffin fraction of diesel, can result in a cloudy appearance in the diesel. The solid fraction crystals can plug fuel supply line and engine parts, such as fuel filters. Cold flow properties of diesel, which can relate to the wax formation, are characterized by cloud point (CP), pour point (PP), and cold filter plugging point (CFPP). In arctic climate zones, the cloud point of diesel must be lower than −10 degrees Celsius (deg C.) according to the European Committee for Standardization, EN 590.

One current method to improve cold flow properties is blending in lighter fractions such as naphtha and kerosene. Blending can impact the properties of diesel. Blending of large quantities of light fractions can negatively affect density, lubricity, flash point, and Cetane index of diesel. In addition, blending can perturb product distribution in a refinery.

Another method includes adding additives such as cloud point depressant. The downsides of adding additives include increasing the cost of the diesel and adding complexity to the production process.

A third method is undercutting of diesel. Paraffins in the high boiling range are responsible for poor cold flow properties. Paraffins can be removed by reducing the distillation cut point of diesel, but distillation results in loss of diesel to the vacuum gas oil and atmospheric residue fraction, both of which have a lower value as compared to diesel.

A fourth method is solvent dewaxing. In a solvent dewaxing process, aliphatic ketone solvents, such as methyl ethyl ketone (MEK) or methyl isobutyl ketone (MIBK), are used to crystallize wax components at low temperatures and then can separate from non-waxy component. A solvent dewaxing process can result in low liquid yield and difficulty in recovering solvents and is not often used in distillate dewaxing. Solvent dewaxing can remove high boiling range paraffins, however this method reduces liquid yield.

A fifth method is catalytic dewaxing. In catalytic dewaxing, long chain paraffins are cracked or isomerized selectively to decrease the cloud point and cold filter plugging point. In a typical catalytic dewaxing, a zeolite-based catalyst is used. The drawbacks of catalytic dewaxing are the loss of diesel to kerosene or naphtha by cracking. In addition, catalytic dewaxing is not suitable for non-hydrotreated feedstock because nitrogen and sulfur compounds are inhibitors to dewaxing catalysts.

Finally, it is noted that aromatics can improve cold flow properties, but EN590 provides limits on the amount of aromatics that can be present in diesel. Straight run diesel, the "as-distilled" fraction from crude oil typically contains low amounts of aromatics. Blending light cycle oil (LCO) fraction from an FCC unit can increase the aromatic content, but only to a limited extent.

SUMMARY

Disclosed are methods for producing diesel. Specifically, disclosed are methods and systems for producing diesel with enhanced cold flow properties.

In a first aspect, a method for producing a diesel having improved cold flow properties is provided. The method includes the steps of introducing a crude oil to a distillation column, separating the crude oil in the distillation unit to produce a light gas oil, and a light vacuum gas oil, where the light gas oil has a T95% cut point in the range between 300 deg C. and 340 deg C., where the light vacuum gas oil has a T95% cut point in the range between 400 deg C. and 430 deg C., introducing the light vacuum gas oil to a supercritical upgrading unit, processing the light vacuum gas oil in the supercritical water unit to produce an upgraded vacuum gas oil, introducing the upgraded vacuum gas oil to a fractionator, separating the upgraded vacuum gas oil in the fractionator to produce an upgraded light fraction, an upgraded light gas oil, and upgraded heavy fraction, introducing the upgraded light gas oil into a diesel pool, where the diesel pool includes diesel, and blending the light gas oil into the diesel pool.

In certain aspects, the diesel in the diesel pool meets the standards of EN590. In certain aspects, the diesel in the diesel pool has a cloud point of less than −3 deg C., further where the diesel has a CFPP of less than −20 deg C., and further where the diesel has a pour point of less than −18 deg C. In certain aspects, the method further includes the steps of separating a light fraction stream in the distillation column, where the light fraction stream has a T95% cut point of less than 240 deg C., mixing the upgraded light fraction with the light fraction stream to produce a mixed light stream, and introducing the mixed light stream to a naphtha and kerosene pool. In certain aspects, the method further includes the steps of separating a heavy vacuum gas oil in the distillation column, where the heavy vacuum gas oil has a T95% cut point of between 560 deg C., separating a vacuum residue stream in the distillation column, where the vacuum residue stream has a T5% cut point of greater than 560 deg C., mixing the heavy vacuum gas oil and the vacuum residue stream to produce a mixed heavy stream, and introducing the mixed heavy stream to a reside upgrading unit. In certain aspects, the resid upgrading unit is selected from the group consisting of fluid catalytic cracking (FCC) unit, resid FCC, hydrocracker, resid hydrodesulfurization (RHDS) hydrotreater, visbreaker, coker, gasifier, and solvent extractor. In certain aspects, the method further includes the steps of separating a residue slip stream from vacuum residue stream, mixing the residue slip stream with the light vacuum gas oil to produce mixed vacuum gas oil stream, and introducing mixed vacuum gas oil to the supercritical upgrading unit. In certain aspects, the step of processing the light vacuum gas oil in the supercritical water unit includes the step of increasing the pressure of the light vacuum gas oil in a hydrocarbon pump to produce a pressurized hydrocarbon feed, where the pressure of the pressurized hydrocarbon feed is greater than the critical pressure of water, increasing the temperature of pressurized hydrocarbon feed in a hydrocarbon heater to produce a hot hydrocarbon stream, where the temperature of the hot hydrocarbon stream is between 10 deg C. and 300 deg C., mixing the hot hydrocarbon stream with a supercritical water in a mixer to produce a mixed feed stream, introducing the mixed feed stream to a supercritical reactor, where the temperature in the supercritical reactor is in the range between 380 deg C. and 600 deg C. and the pressure in the supercritical reactor is in the range between 3203 psig and 5150 psig, where the residence time in the supercritical reactor is in the range between 10 seconds and 60 minutes, allowing conversion reactions in the supercritical reactor to produce an effluent stream such that the mixed feed stream undergoes conversion reactions, reducing the temperature of the effluent stream to a cooling device to produce a cooled stream, where the cooled stream is at a temperature in the range between 10 deg C. and 200 deg C., reducing the pressure of the cooled stream in a depressurizing device to produce a modified stream, where the pressure of modified stream is in the range between 0 psig and 300 psig, introducing the depressurizing device to a separator, separating the modified stream in the separator to produce a gases stream and a liquid stream, introducing the liquid stream to an oil-water separator, and separating the liquid stream in the oil-water separator to produce the upgraded vacuum gas oil and a water product. In certain aspects, the distillation column is in the absence of an external supply of catalyst, further where the supercritical upgrading unit is in the absence of an external supply of catalyst, and further where the fractionator is in the absence of an external supply of catalyst. In certain aspects, the distillation column is in the absence of an external supply of hydrogen, further where the supercritical upgrading unit is in the absence of an external supply of hydrogen, and further where the fractionator is in the absence of an external supply of hydrogen.

In a second aspect, a method for producing a diesel having improved cold flow properties is provided. The method includes the steps of introducing a crude oil to a distillation column, separating the crude oil in the distillation unit to produce a light gas oil, and a light vacuum gas oil, where the light gas oil has a T95% cut point in the range between 300 deg C. and 340 deg C., where the light vacuum gas oil has a T95% cut point in the range between 400 deg C. and 430 deg C., introducing the light gas oil to a gas oil hydrodesulfurization unit, where the gas oil hydrodesulfurization unit operates at a temperature in the range between 300 deg C. and 420 deg C., where the gas oil hydrodesulfurization unit operates at a pressure between 100 psig and 1050 psig, where the gas oil hydrodesulfurization unit operates at a liquid hourly space velocity between 0.5 h−1 and 6 h−1, where the gas oil hydrodesulfurization unit includes a hydrodesulfurization catalyst, processing the light gas oil in the gas oil hydrodesulfurization unit to produce a desulfurized light gas oil, introducing the light vacuum gas oil to a supercritical upgrading unit, processing the light vacuum gas oil in the supercritical water unit to produce an upgraded vacuum gas oil, introducing the upgraded vacuum gas oil to an upgrading hydrodesulfurization unit, where the upgrading hydrodesulfurization unit operates at a temperature in the range between 300 deg C. and 420 deg C., where the upgrading hydrodesulfurization unit operates at a pressure between 100 psig and 1050 psig, where the upgrading hydrodesulfurization unit operates at a liquid hourly space velocity between 0.5 h−1 and 6 h−1, where the upgrading hydrodesulfurization unit includes a hydrodesulfurization catalyst, processing the upgraded vacuum gas oil in the hydrodesulfurization unit to produce a desulfurized vacuum gas oil, introducing the desulfurized vacuum gas oil to a fractionator, separating the desulfurized vacuum gas oil in the fractionator to produce an upgraded light fraction, an upgraded light gas oil, and an upgraded heavy fraction, introducing the upgraded light gas oil into a diesel pool, where the diesel pool includes diesel, and blending the desulfurized light gas oil into the diesel pool.

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

Figure 1:
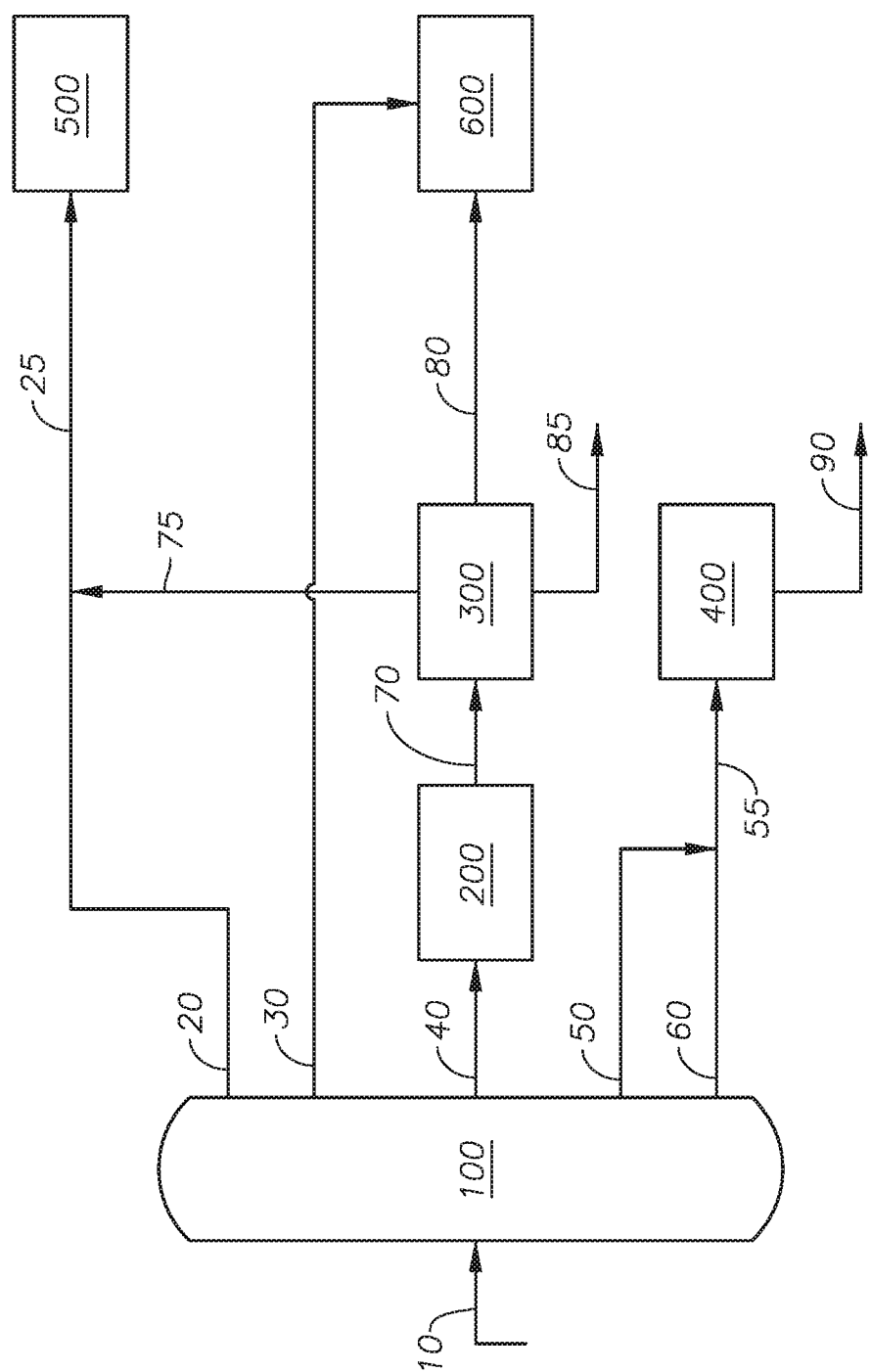
FIG. 1 provides a process diagram of an embodiment of the process.

In the accompanying Figures, similar components or features, or both, may have a similar reference label.

DETAILED DESCRIPTION

While the scope of the apparatus and method will be described with several embodiments, it is understood that one of ordinary skill in the relevant art will appreciate that many examples, variations and alterations to the apparatus and methods described here are within the scope and spirit of the embodiments.

Accordingly, the embodiments described are set forth without any loss of generality, and without imposing limitations, on the embodiments. Those of skill in the art understand that the scope includes all possible combinations and uses of particular features described in the specification.

Described here are processes and systems for a diesel upgrading process with improved cold flow properties as compared to a conventional diesel upgrading process. Advantageously, the diesel upgrading process can improve the cold flow properties without using hydrogen and catalyst, while increasing the production yield of diesel by at least between 2% and 5% as compared to conventional processes. Advantageously, the diesel upgrading process can improve refining margins. Advantageously, the diesel upgrading process has improved cold flow properties without sacrificing liquid yield. Advantageously, the diesel upgrading process can produce an increase of short chain aromatics in the light diesel fraction, useful as feedstock for benzene, toluene, xylene (BTX) production.

As used throughout, "external supply of hydrogen" refers to the addition of hydrogen to the feed to the reactor or to the reactor itself. For example, a reactor in the absence of an external supply of hydrogen means that the feed to the reactor and the reactor are in the absence of added hydrogen, gas ($H_2$) or liquid, such that no hydrogen (in the form $H_2$) is a feed or a part of a feed to the reactor.

As used throughout, "external supply of catalyst" refers to the addition of catalyst to the feed to the reactor or the presence of a catalyst in the reactor, such as a fixed bed catalyst in the reactor. For example, a reactor in the absence of an external supply of catalyst means no catalyst has been added to the feed to the reactor and the reactor does not contain a catalyst bed in the reactor.

As used throughout, "cold flow properties" refers to one or more of the following properties of diesel: cloud point (CP), pour point (PP), and cold filter plugging point (CFPP).

As used throughout, "cloud point" refers to the temperature below which wax in diesel forms a cloudy appearance. Cloud point can be measured according to ASTM D5772 and ASTM D2500.

As used throughout, "pour point" refers to the lowest temperature at which a liquid remains pourable, a high pour point is typically related to a high paraffin content. Pour point can be measured according to ASTM D5950.

As used throughout, "cold filter plugging point" or "CFPP" refers to the lowest temperature at which a given volume of diesel will still flow through a specific, standardized filter. Cold filter plugging point according to ASTM D6371.

As used throughout, "diesel" refers to a composite of hydrocarbons having a boiling point range between an initial boiling point of 130 deg C. and a final boiling point of 390 deg C. Both initial boiling point and final boiling point can be measured by ASTM D86.

As used throughout, "T95% cut point" refers to distillation recovery temperature at which 95 percent (%) of the hydrocarbons in a stream evaporate.

As used throughout, "EN 590" refers to CEN/TC 19—Gaseous and liquid fuels, lubricants and related products of petroleum, synthetic and biological origin, at reference number EN 590:2013+A13:2017, which describes the properties required for automotive diesel fuel for use in diesel engines. EN 590 specifies that the T95% cut point of diesel is less than 360 deg C.

As used throughout, "atmospheric residue" or "atmospheric residue fraction" refers to the fraction of oil-containing streams having an initial boiling point (IBP) of 650 deg F, such that all of the hydrocarbons have boiling points greater than 650 deg F and includes the vacuum residue fraction. Atmospheric residue can refer to the composition of an entire stream, such as when the feedstock is from an atmospheric distillation unit, or can refer to a fraction of a stream, such as when a whole range crude is used.

As used throughout, "vacuum residue" or "vacuum residue fraction" refers to the fraction of oil-containing streams having an IBP of 1050 deg F. Vacuum residue can refer to the composition of an entire stream, such as when the feedstock is from a vacuum distillation unit or can refer to a fraction of stream, such as when a whole range crude is used.

As used throughout, "asphaltene" refers to the fraction of an oil-containing stream which is not soluble in a n-alkane, particularly, n-heptane.

As used throughout, "heavy fraction" refers to the fraction in the petroleum feed having a true boiling point (TBP) 10% that is equal to or greater than 650 deg F (343 deg C.), and alternately equal to or greater than 1050 deg F (566 deg C.). Examples of a heavy fraction can include the atmospheric residue fraction or vacuum residue fraction. The heavy fraction can include components from the petroleum feed that were not converted in the supercritical water reactor. The heavy fraction can also include hydrocarbons that were dimerized or oligomerized in the supercritical water reactor due to either lack of hydrogenation or resistance to thermal cracking.

As used throughout, "distillable fraction" or "distillate" refers to the hydrocarbon fraction lighter than the distillation residue from an atmospheric distillation process or a vacuum distillation process.

As used throughout, "coke" refers to the toluene insoluble material present in petroleum.

As used throughout, "cracking" refers to the breaking of hydrocarbons into smaller ones containing few carbon atoms due to the breaking of carbon-carbon bonds.

As used throughout, "upgrade" means one or all of increasing API gravity, decreasing the amount of impurities, such as sulfur, nitrogen, and metals, decreasing the amount of asphaltene, and increasing the amount of distillate in a process outlet stream relative to the process feed stream. One of skill in the art understands that upgrade can have a relative meaning such that a stream can be upgraded in comparison to another stream, but can still contain undesirable components such as impurities.

As used here, "conversion reactions" refers to reactions that can upgrade a hydrocarbon stream including cracking, isomerization, alkylation, dimerization, aromatization, cyclization, desulfurization, denitrogenation, deasphalting, and demetallization.

As used here, "Cetane number" or "Cetane Number" refers to the ignition characteristics of diesel fuel and can be measured according to ASTM 613. The Cetane Number can be estimated from actual engine testing.

As used here, "Cetane index" refers to the calculated value from the density and distillation range to characterize ignition properties of diesel fuel. The Cetane index does not incorporate data from actual engine testing. The Cetane index can be measured according to ASTM D4737 and ASTM D976.

As used here, "gas-to-liquid (GTL) processes" refers to processes to convert natural gas to liquid fuel through catalytic conversion. GTL processes can produce highly paraffinic liquid fuel.

The following embodiments, provided with reference to the figures, describe the upgrading process.

Referring to FIG. 1, a process flow diagram of a diesel upgrading process is provided. Crude oil 10 is introduced to distillation column 100. Crude oil 10 can be any source of crude oil including crude oil derived from gas-to-liquid (GTL) processes. In at least one embodiment, crude oil 10 is not derived from biomass materials.

Distillation column 100 can be any type of separation unit capable of separating a hydrocarbon stream into component parts. An example of distillation column 100 includes an atmospheric distillation column. Distillation column 100 can be operated to separate naphtha, kerosene, light gas oil, light vacuum gas oil, and heavy vacuum gas oil. Distillation column 100 can operate based on targeted cut points of distillation.

Distillation column 100 can produce light fraction stream 20, light gas oil 30, light vacuum gas oil 40, heavy vacuum gas oil 50, and vacuum residue stream 60. In an alternate embodiment, distillation column 100 can produce a light fraction stream, a light gas oil, a light vacuum gas oil, and a heavy stream, where the heavy stream contains the heavy vacuum gas oil and the vacuum residue stream. Light fraction stream 20 can have a T95% cut point of less than 240 deg C. Light fraction stream 20 can contain naphtha and kerosene. Light fraction stream 20 can be introduced to naphtha and kerosene pool 500.

Light gas oil 30 can have a T95% cut point in the range between 300 deg C. and 340 deg C. Light gas oil 30 can contain light gas oil. Light gas oil 30 can be introduced to diesel pool 600. The diesel upgrading process undercuts the light gas oil fraction as compared to a conventional separation unit which conventional separation unit produces a light gas oil stream having a T95% cut point in the range between 340 deg C. and 380 deg C.

Light vacuum gas oil 40 can have a T95% cut point in the range between 400 deg C. and 430 deg C. Light vacuum gas oil 40 can contain light vacuum gas oil. The diesel upgrading process wide cuts the light vacuum gas oil fraction as compared to a conventional separation unit which produces a light vacuum gas oil stream having a T95% cut point in the range between 400 deg C. and 430 deg C. Light vacuum gas oil 40 can be introduced to supercritical upgrading unit 200.

Heavy vacuum gas oil 50 can have a T95% cut point of greater than 560 deg C. Heavy vacuum gas oil 50 can contain heavy vacuum gas oil. Heavy vacuum gas oil 50 is not introduced or processed in supercritical upgrading unit 200.

Vacuum residue stream 60 can have a T5% cut point of greater than 560 deg C. Vacuum residue stream 60 can include vacuum residue fraction. Vacuum residue stream 60 contains the heaviest fraction of crude oil. In at least one embodiment, vacuum residue stream 60 is not controlled by distillation but is the remainder fraction not separated in heavy vacuum gas oil 50.

Heavy vacuum gas oil 50 and vacuum residue stream 60 can be mixed to produce mixed heavy stream 55. Mixed heavy stream 55 can be introduced to resid upgrading unit 400. Resid upgrading unit 400 can be any process unit capable of upgrading a heavy fraction stream. Examples of resid upgrading unit 400 include fluid catalytic cracking (FCC) unit, resid FCC, hydrocracker, resid hydrodesulfurization (RHDS) hydrotreater, visbreaker, coker, gasifier, and solvent extractor. Resid upgrading unit 400 can produce resid upgraded product 90.

Supercritical upgrading unit 200 can process light vacuum gas oil 40 to produce upgraded vacuum gas oil 70. Supercritical upgrading unit 200 can be described with reference to FIG. 2.

Water feed 202 is introduced to supercritical upgrading unit 200. Water feed 202 can be a demineralized water having a conductivity less than 1.0 microSiemens per centimeter (μS/cm), alternately less 0.5 μS/cm, and alternately less than 0.1 μS/cm. In at least one embodiment, water feed 20 is demineralized water having a conductivity less than 0.1 μS/cm. Water feed 20 can have a sodium content less than 5 micrograms per liter (μg/L) and alternately less than 1 μg/L. Water feed 20 can have a chloride content less than 5 μg/L and alternately less than 1 μg/L. Water feed 20 can have a silica content less than 3 μg/L.

Water feed 202 can be passed to water pump 204. Water pump 204 can be any type of pump capable of increasing the pressure of water feed 202. In at least one embodiment, water pump 204 is a diaphragm metering pump. The pressure of water feed 202 can be increased in water pump 204 to produce pressurized water 205. The pressure of pressurized water 205 can be greater than the critical pressure of water. Pressurized water 205 can be introduced to water heater 208.

Water heater 208 can be any type of heat exchanger capable of increasing the temperature of pressurized water 205. Examples of heat exchangers that can be used as water heater 208 can include an electric heater, a fired heater, a cross exchanger, and other known heaters. The temperature of pressurized water 205 can be increased in water heater 208 to produce supercritical water 210. The temperature of supercritical water 210 can be equal to or greater than the critical temperature of water, alternately between 374 deg C. and 600 deg C., and alternately between 400 deg C. and 550 deg C.

Light vacuum gas oil 40 can be passed to hydrocarbon pump 214. Hydrocarbon pump 214 can be any type of pump capable of increasing the pressure of light vacuum gas oil 40. In at least one embodiment, hydrocarbon pump 214 is a diaphragm metering pump. The pressure of light vacuum gas oil 40 can be increased in hydrocarbon pump 214 to a pressure greater than the critical pressure of water to produce pressurized hydrocarbon feed 215. Pressurized hydrocarbon feed 215 can be passed to hydrocarbon heater 218.

Hydrocarbon heater 218 can be any type of heat exchanger capable increasing the temperature of pressurized hydrocarbon feed 215. Examples of heat exchangers capable of being used as hydrocarbon heater 218 can include an electric heater, a fired heater, a cross exchanger, and other known heaters. In at least one embodiment, hydrocarbon heater 218 can be cross exchanged with effluent stream 245. The temperature of pressurized hydrocarbon feed 215 can be increased in hydrocarbon heater 218 to produce hot hydrocarbon stream 225. The temperature of hot hydrocarbon stream 225 can be between 10 deg C. and 300 deg C. and alternately between 50 deg C. and 200 deg C. Maintaining the temperature of hot hydrocarbon stream 225 at less than 300 deg C. reduces the formation of coke in hot hydrocarbon stream 225 and in supercritical reactor 240.

Hot hydrocarbon stream 225 and supercritical water 210 can be passed to mixer 230. Mixer 230 can be any type of mixing device capable of mixing a petroleum stream and a supercritical water stream. Examples of mixing devices suitable for use as mixer 230 can include a static mixer, an inline mixer, an impeller-embedded mixer, and other known mixers. The ratio of the volumetric flow rate of light vacuum gas oil 40 to water feed 202 can be in the range between 1:1 and 1:10 at standard temperature and pressure (SATP), alternately between 1:1 and 1:5 at SATP, alternately between 1:1 and 1:2, alternately greater than 1:1.05, and alternately greater than 1:1.1. In at least one embodiment, the volumetric flow rate of water feed 202 is greater than the volumetric flow rate of light vacuum gas oil 40 to minimize and alternately prevent the recombination of cracked molecules by dilution. Advantageously, having a volumetric flow rate of water feed 202 that is greater than the volumetric flow rate of light vacuum gas oil 40 can minimize thermal cracking reactions that can occur without the presence of supercritical water, thus can minimizing the formation of coke and gas. Hot hydrocarbon stream 225 and supercritical water 210 can be mixed to produce mixed feed 44. The pressure of mixed feed stream 235 can be greater than the critical pressure of water. The temperature of mixed feed stream 235 can depend on the temperatures of supercritical water 210 and hot hydrocarbon stream 225. Mixed feed stream 235 can be introduced to supercritical reactor 240.

Supercritical reactor 240 can include one or more reactors in series. Supercritical reactor 240 can be any type of reactor capable of allowing conversion reactions. Examples of reactors suitable for use in supercritical reactor 240 can include tubular-type, vessel-type, CSTR-type, and combinations of the same. In at least one embodiment, supercritical reactor 240 includes a tubular reactor, which advantageously prevents precipitation of reactants or products. Supercritical reactor 240 can include an upflow reactor, a downflow reactor, and a combination of an upflow reactor and downflow reactor. In at least one embodiment, supercritical reactor 240 includes an upflow reactor, which advantageously prevents channeling of reactants resulting in an increased reaction yield. Advantageously, by processing only the light vacuum gas oil in supercritical reactor 240, the size of supercritical reactor 240 can be reduced relative to a supercritical water reactor that processes the entire crude oil portion. Supercritical reactor 240 is in the absence of an external supply of catalyst. In at least one embodiment, supercritical reactor 240 is in the absence of an external supply of hydrogen.

The temperature in supercritical reactor 240 can be maintained at greater than the critical temperature of water, alternately in the range between 380 deg C. and 600 deg C., and alternately in the range between 390 deg C. and 450 deg C. The pressure in supercritical reactor 240 can be maintained at a pressure in the range between 3203 pounds per square inch gauge (psig) and 5150 psig and alternately in the range between 3300 psig and 4300 psig. The residence time of the reactants in supercritical reactor 240 can between 10 seconds and 60 minutes and alternately between 5 minute and 30 minutes. The residence time is calculated by assuming that the density of the reactants in supercritical reactor 240 is the same as the density of water at the operating conditions of supercritical reactor 240.

The reactants in supercritical reactor 240 can undergo conversion reactions to produce effluent stream 245. Effluent stream 245 can be introduced to cooling device 250.

Cooling device 250 can be any type of heat exchange device capable of reducing the temperature of effluent stream 245. Examples of cooling device 250 can include double pipe type exchanger and shell-and-tube type exchanger. In at least one embodiment, cooling device 250 can be a cross exchanger with pressurized hydrocarbon feed 215. The temperature of effluent stream 245 can be reduced in cooling device 250 to produce cooled stream 255. The temperature of cooled stream 255 can be between 10 deg C. and 200 deg C. and alternately between 30 deg C. and 150 deg C. Cooled stream 255 can be introduced to depressurizing device 260.

Depressurizing device 260 can be any type of device capable of reducing the pressure of a fluid stream. Examples of depressurizing device 260 can include a pressure letdown valve, a pressure control valve, and a back pressure regulator. The pressure of cooled stream 255 can be reduced to produce modified stream 265. Modified stream 265 can be between 0 psig and 300 psig.

Modified stream 265 can be introduced to separator 270. Separator 270 can be any type of separation device capable of separating a fluid stream into gas phase and liquid phase. Modified stream 265 can be separated to produce gases stream 272 and liquid stream 275. Liquid stream 275 can be introduced to oil-water separator 280.

Oil-water separator 280 can be any type of separation device capable of separating a fluid stream into a hydrocarbon containing stream and a water stream. Liquid stream 275 can be separated in oil-water separator 280 to produce upgraded vacuum gas oil 70 and water product 285.

Water product 285 can be treated and recycled to front of the supercritical upgrading unit or can be disposed.

Upgraded vacuum gas oil 70 can contain less than 200 parts-per-million by weight (ppm wt) water. The conditions in oil-water separator 280 can be adjusted to attain upgraded vacuum gas oil 70 with an amount of water less than 200 ppm wt. In at least one embodiment, upgraded vacuum gas oil 70 can be subjected to a dehydration process to reduce the amount of water following the oil-water separator if needed to reduce the amount of water to 200 ppm wt or less. The dehydration process can include an adsorption bed.

Upgraded vacuum gas oil 70 can contain naphtha range components, kerosene range components, and light gas oil range components. Supercritical upgrading unit 200 is in the absence of a step or process to recycle upgraded vacuum gas oil 70, such that upgraded vacuum gas oil is not recycled in supercritical upgrading unit 200. Upgraded vacuum gas oil 70 can have a reduced cloud point as compared to light vacuum gas oil 40.

Treating light vacuum gas oil 40 in supercritical upgrading unit 200 can produce upgraded vacuum gas oil 70 having hydrocarbons in the naphtha range, kerosene range, and light gas oil range. Advantageously, treating light vacuum gas oil 40 in supercritical upgrading unit 200 can crack long chain paraffins, normal paraffins and aromatics with alkyl substitutes in light vacuum gas oil 40. Upgraded vacuum gas oil 70 can have shorter chain paraffins than are present in light vacuum gas oil 40. Long chain paraffins, such as paraffins with at least 24 carbon atoms, can have a greater melting point than shorter chain paraffins. Long chain paraffins with at least 24 carbon atoms have a boiling of about 340 deg C., which is in the range of diesel fuel with a T95% cut point of between 330 deg C. and 360 deg C. Upgraded vacuum gas oil 70 can have light gas oil range alkylaromatics, which have a lower melting point than paraffins. In at least one embodiment, light gas oil range alkylaromatics do not include toluene, which is in the naphtha range alkylaromatics. Advantageously, aromatization can occur in supercritical upgrading unit 200. It is understood that olefins, formed from thermal cracking of paraffins, can be cyclized and dehydrogenated into aromatics during a supercritical water process. By generating aromatics, the supercritical upgrading process improves the cold flow properties of the upgraded vacuum gas oil, as compared to a hydrocracker or hydrotreater, which decreases the aromatic content in the product stream.

Advantageously, treating light vacuum gas oil in supercritical upgrading unit 200 eliminates or minimizes the production of coke, such that solids separation in supercritical upgrading unit 200 is not required.

Returning to FIG. 1, upgraded vacuum gas oil 70 can be introduced to fractionator 300.

Fractionator 300 can be any type of separation unit capable of separating a stream containing hydrocarbons. Examples of fractionator 300 can include a distillation column having multiple-stages of internal reflux and a flashing column. Fractionator 300 can produce upgraded light fraction 75, upgraded light gas oil 80, and upgraded heavy fraction 85.

Upgraded light fraction 75 can contain the naphtha range hydrocarbons and kerosene range hydrocarbons present in vacuum gas oil 70. Upgraded light fraction 75 can be mixed with light fraction stream 20 to produce mixed light stream 25 and introduced to naphtha and kerosene pool 500. In at least one embodiment, upgraded light fraction 75 can be introduced to naphtha and kerosene pool 500 without first mixing with light fraction stream 20.

Upgraded light gas oil 80 can contain the light gas oil range hydrocarbons present in vacuum gas oil 70. The conditions in fractionator 300 can be adjusted such that the T95% cut point of upgraded light gas oil 80 meets the EN 590 specification. In at least one embodiment, the light gas oil in upgraded light gas oil 80 has improved cold flow properties as compared to the light gas oil in light gas oil 30. Fractionator 300 can include one or more separation units. The separation units can include an atmospheric distillation column, a vacuum distillation column, and combinations of the same. The atmospheric distillation column can produce naphtha, kerosene, gas oil, atmospheric residue, and combinations of the same. The atmospheric distillation column can operate at a temperature between 250 deg C. and 350 deg C. and a pressure between 0.5 atmospheres (atm) and 1.5 atm. The vacuum distillation column can separate the atmospheric residue to produce light vacuum gas oil, heavy vacuum gas oil, vacuum residue, and combinations of the same. The vacuum distillation column can operate at a temperature between 250 deg C. and 430 deg C. and a pressure between 10 millimeters of mercury (mmHg) absolute (10-100 Torr). In at least one embodiment, fractionator 300 can include an atmospheric distillation column and a vacuum distillation column.

Upgraded light gas oil 80 can be mixed into diesel pool 600. Diesel pool 600 can contain diesel. The separation conditions that produce light gas oil 30 and upgraded light gas oil 80 can be adjusted to produce a diesel pool containing diesel that meets the standards of EN 590. Diesel in diesel pool 600 can have a density between 0.820 kilograms per liter (kg/l) and 0.845 kg/l measured at 15 deg C., a Cetane number of greater than 51, a Cetane index of greater than 46, a flash point of greater than 55 deg C., a total sulfur content of less than 10 parts-per-million by weight (wt ppm) sulfur, T95% cut point of less than 360 deg C., a polycyclic aromatics content of less than 11 wt %, a cloud point of less than −10 deg C. (corresponding to the arctic region, class 0), a pour point of −22 deg C., and a CFPP of less than −20 deg C. (corresponding to arctic region, class 0). Advantageously, the overall yield of diesel in the present process is greater than conventional diesel forming process. The diesel in diesel pool can be hydrotreated to reduce the sulfur content to below 10 wt ppm.

Upgraded heavy fraction 85 can contain the hydrocarbons heavier than the hydrocarbons in upgraded light gas oil 80, including unconverted fractions from supercritical upgrading unit 200.

Heavy vacuum gas oil 50 is not introduced to supercritical upgrading unit 200 because while supercritical water can crack alkyl substitutes on polycyclic aromatics it cannot open the aromatic rings. Heavy vacuum gas oil tends to have greater quantities of polycylic aromatics as compared to light vacuum gas oil. Thus, submitting heavy vacuum gas oil to supercritical upgrading unit 200 would produce a light gas oil product with increased amounts of polycyclic aromatics. Due to the limits on polycyclic aromatics in diesel, the heavy vacuum gas oil is not treated in supercritical upgrading unit 200.

Figure 3:
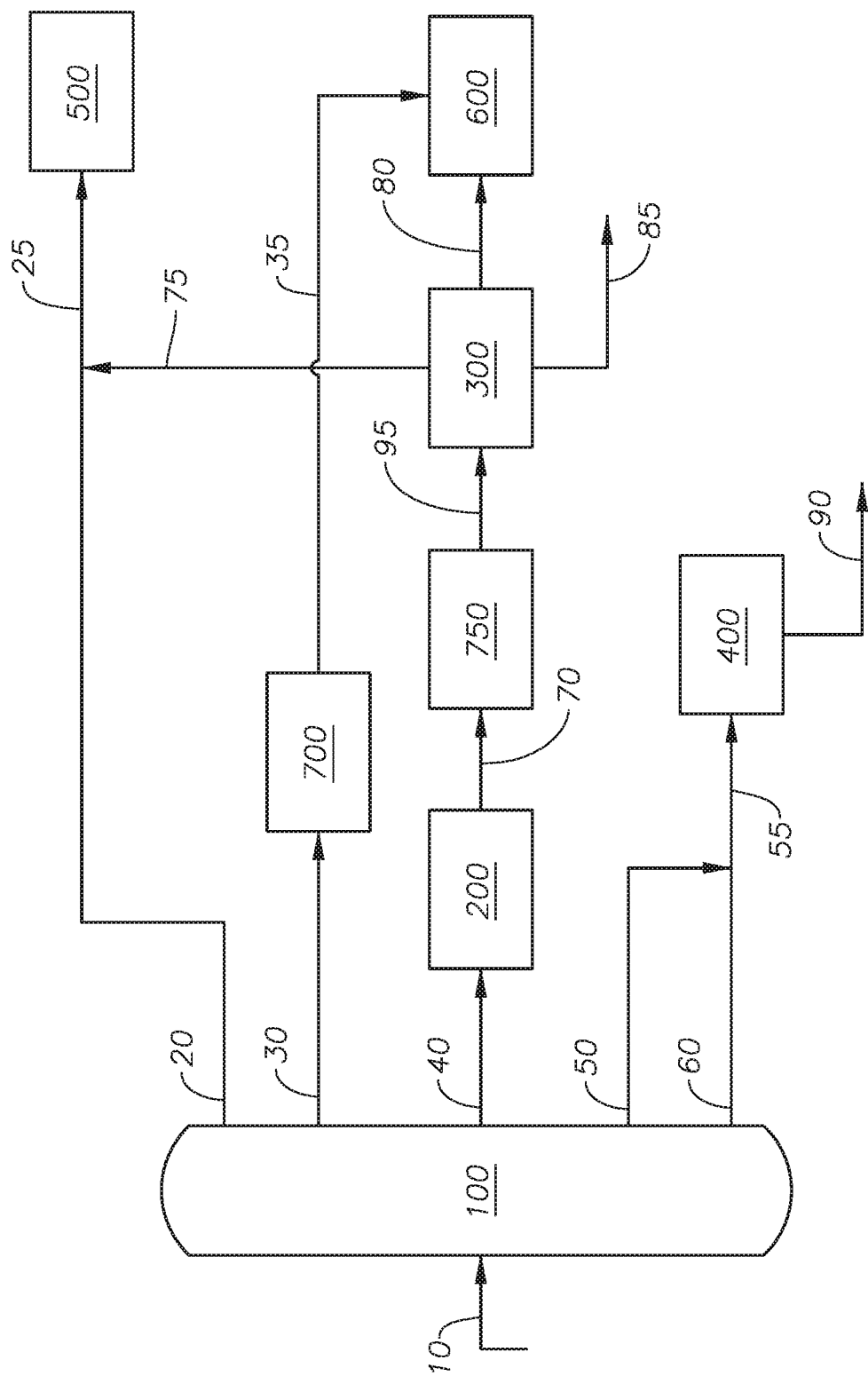
FIG. 3 provides a process diagram of an embodiment of the process.

An alternate embodiment for the diesel upgrading process is described with reference to FIG. 3 and FIG. 1. Light gas oil 30 is introduced to gas oil hydrodesulfurization unit 700 to produce desulfurized light gas oil 35. Gas oil hydrodesulfurization unit 700 removes sulfur from light gas oil 30.

Gas oil hydrodesulfurization unit 700 can operate at a temperature in the range between 300 deg C. and 420 deg C. and alternately between 320 deg C. and 380 deg C. The pressure can be in the range between 100 psig and 1050 psig, alternately between 150 psig and 750 psig. The liquid hourly space velocity (LHSV) can be between 0.5 per hour ($h^{-1}$) and 6 $h^{-1}$ and alternately between 1 $h^{-1}$ and 4 $h^{-1}$. Gas oil hydrodesulfurization unit 700 can include a hydrodesulfurization catalyst. The hydrodesulfurization catalyst can include cobalt molybdenum sulfides with aluminum oxide ($CoMoS/Al_2O_3$), nickel molybdenum sulfides with aluminum oxide ($NiMoS/Al_2O_3$), and combinations of the same. The hydrodesulfurization catalyst can include promoters such as boron, phosphorous, and zeolites. Hydrogen gas can be added to the gas oil hydrodesulfurization unit 700. The ratio of the volumetric flow rate of the hydrogen gas to light gas oil 30 can be in the range from 30 normal cubic meters per cubic meters ($Nm^3/m^3$) and 300 $Nm^3/m^3$, and alternately in the range from 100 $Nm^3/m^3$ and 250 $Nm^3/m^3$.

Figure 4:
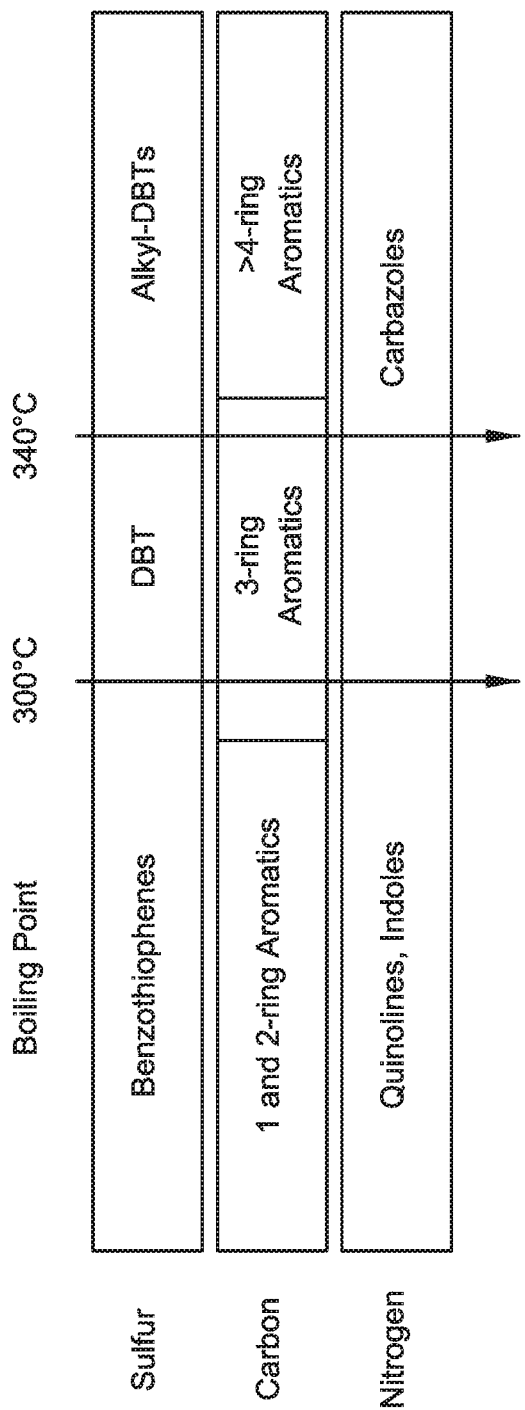
FIG. 4 provides a pictorial representation of the components in different boiling point ranges.

Advantageously, the light gas oil in light gas oil 30 can be in the absence of refractory sulfur compounds, such as 4,6-DMDBT, and alkyl carbazoles, such as 1, 8-dimethylcarbazole, which are both strong inhibitors for a hydrodesulfurization catalyst. The absence of refractory sulfur compounds and alkyl carbazoles is due to the T95% cut point of light gas oil 30, as can be seen in FIG. 4 As a result of the absence of refractory sulfur compounds and alkyl carbazoles, light gas oil 30 will have a high activity in a hydrodesulfurization unit. Consequently, gas oil hydrodesulfurization unit 700 can operate under mild conditions, such as pressures less than 1050 psig and LHSV greater than 0.5 $h^{-1}$, which increases liquid yield. Operating at the hydrodesulfurization unit at mild conditions can minimize the loss of diesel hydrocarbon molecules due to such molecules being hydrocracked into naphtha range hydrocarbons and kerosene range hydrocarbons. At the same time, hydrodesulfurization can achieve deep desulfurization of light gas oil 30.

Desulfurized light gas oil 35 can contain less than 10 ppm wt sulfur. Desulfurized light gas oil 35 can be introduced to diesel pool 600.

Upgraded vacuum gas oil 70 can be processed in upgrading hydrodesulfurization unit 750 to produce desulfurized vacuum gas oil 95.

Upgrading hydrodesulfurization unit 750 can be at a temperature in the range between 320 deg C. and 420 deg C. and alternately between 340 deg C. and 400 deg C. The pressure can be in the range between 450 psig and 1500 psig, alternately between 400 psig and 1050 psig. The liquid hourly space velocity (LHSV) can be between 0.25 per hour ($h^{-1}$) and 4 $h^{-1}$ and alternately between 1 $h^{-1}$ and 3 $h^{-1}$. Upgrading hydrodesulfurization unit 750 can include the hydrodesulfurization catalyst. The hydrodesulfurization catalyst can include cobalt molybdenum with aluminum oxide ($CoMoS/Al_2O_3$), nickel molybdenum with aluminum oxide ($NiMoS/Al_2O_3$), and combinations of the same. The hydrodesulfurization catalyst can include promoters such as boron, phosphorous, and zeolites. Hydrogen gas can be added to the upgrading hydrodesulfurization unit 750. The ratio of the volumetric flow rate of the hydrogen gas to upgraded vacuum gas oil 70 can be in the range from 100 $Nm^3/m^3$ and 600 $Nm^3/m^3$, and alternately in the range from 150 $Nm^3/m^3$ and 400 $Nm^3/m^3$.

Advantageously, subjecting light vacuum gas oil 40 to supercritical upgrading unit 200 results in upgrading a portion of the light vacuum gas oil to smaller molecules, which results in enhanced hydrodesulfurization activity. Supercritical upgrading unit 200 reduces the amount of heavier sulfur compounds and the amount of aromatics. Consequently, upgrading hydrodesulfurization unit 750 can operate under mild conditions, such as pressures less than 1500 psig and LHSV greater than 0.25 $h^{-1}$, which increases liquid yield. Operating at the hydrodesulfurization unit at mild conditions can minimize the loss of diesel hydrocarbon molecules due to such molecules being hydrocracked into naphtha range hydrocarbons and kerosene range hydrocarbons.

Desulfurized vacuum gas oil 95 can contain less than 300 ppm wt. Desulfurized vacuum gas oil 95 can be introduced to fractionator 300. Upgraded light gas oil 80 can contain less than 10 ppm wt sulfur. The remaining sulfur is present in upgraded heavy fraction 85.

Figure 5:
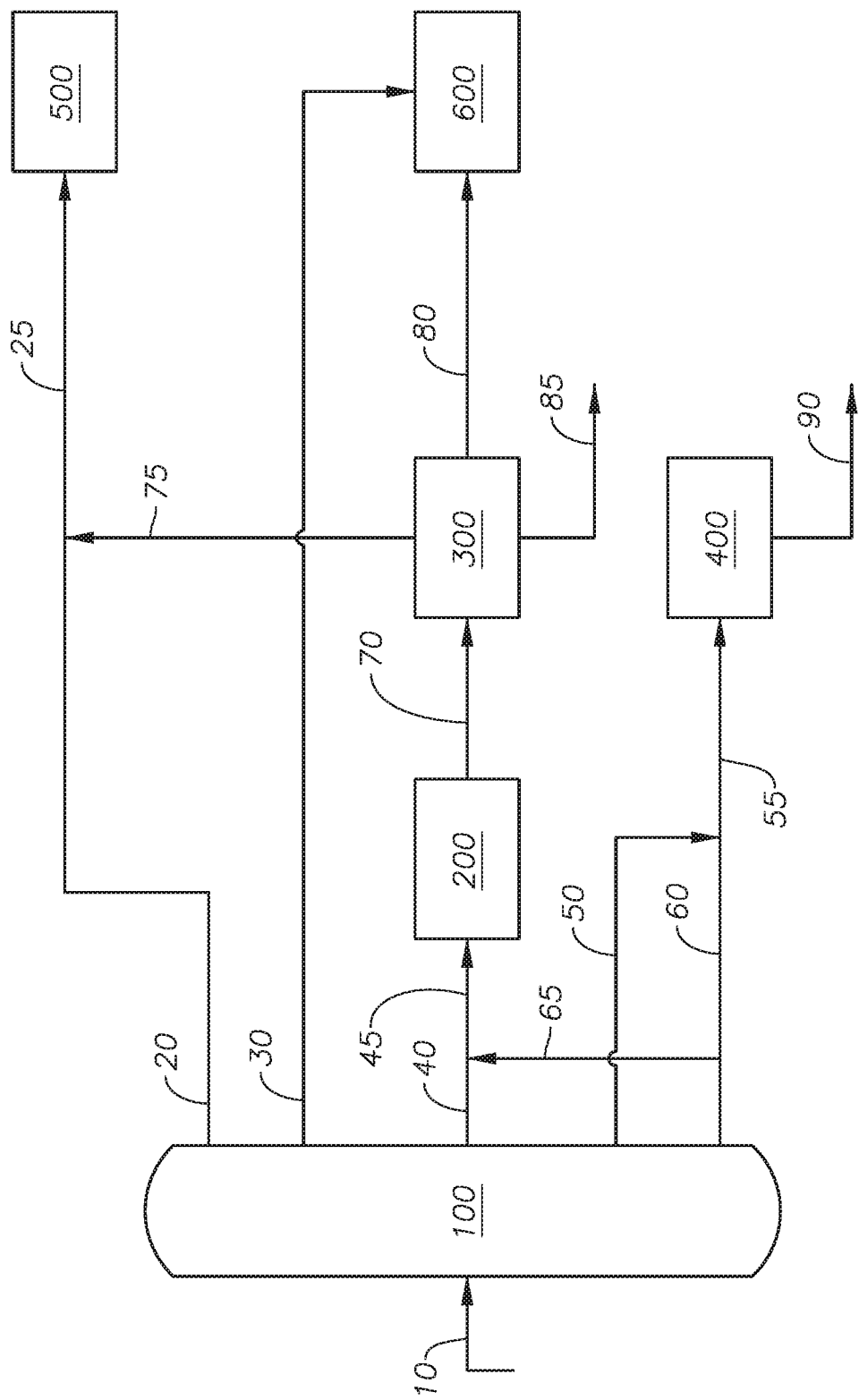
FIG. 5 provides a process diagram of an embodiment of the process.

An alternate embodiment for the diesel upgrading process is described with reference to FIG. 5 and FIG. 1.

Residue slip stream 65 can be separated from vacuum residue stream 60. Residue slip stream 65 can contain the vacuum residue fraction. Any unit capable of separating a slip stream can be used. In at least one embodiment, residue slip stream 65 is separated through a three way valve. Residue slip stream 65 can be mixed with light vacuum gas oil 40 to produce mixed vacuum gas oil stream 45. The flow rate of residue slip stream 65 can be adjusted such that the amount of the vacuum residue fraction present in mixed vacuum gas oil stream 45 can be between 0.1 wt % and 10 wt % and alternately between 1 wt % and 5 wt %. Advantageously, vacuum residue fraction has aliphatic sulfur compounds that can generate hydrogen sulfide during reaction. Hydrogen sulfide is a known hydrogen transfer agent. In addition, vacuum residue contains other natural hydrogen donors which can be utilized with the aid of hydrogen sulfide. Therefore, by adding an amount of the vacuum residue fraction to the light vacuum gas oil in light vacuum gas oil 40 the conversion rate in supercritical upgrading unit 200 can be increased while a reduced amount of olefins in the diesel range are produced. In addition, processing a part of the vacuum residue fraction in supercritical upgrading unit 200 can reduce the load to resid upgrading unit 400.

Mixed vacuum gas oil stream 45 can be introduced to supercritical upgrading unit 200. Supercritical upgrading unit 200 can be operated as described with reference to FIG. 2, where the pressure of mixed vacuum gas oil stream 45 can be increased in hydrocarbon pump.

In at least one embodiment, the diesel upgrading process is in the absence of an external supply of hydrogen. In at least one embodiment, the diesel upgrading process is in the absence of an external supply of catalyst.

EXAMPLES

Example 1

The Example was conducted by a lab scale unit. Example 1 is a comparative example where crude oil was separated in an atmospheric distillation column to produce a light gas oil. The crude oil was an Arabian Light Crude oil having an API gravity of 35 degrees and a total sulfur content of 1.7 wt %. The volumetric flow rate of the crude oil was 400,000 barrels per day (bpd). The atmospheric distillation column was operated such that the T95% of the light gas oil was 357 deg C., producing a flow rate of the light gas oil of 100,000 barrels per day. The light gas oil was a straight-run light gas oil. The cloud point of the light gas oil was −5 deg C. The target cloud point value was −10 deg C., thus the cloud point of the light gas oil in Example 1 was greater than the target cloud point. The properties of the light gas oil can be found in Table 1.

Example 2

Figure 6:
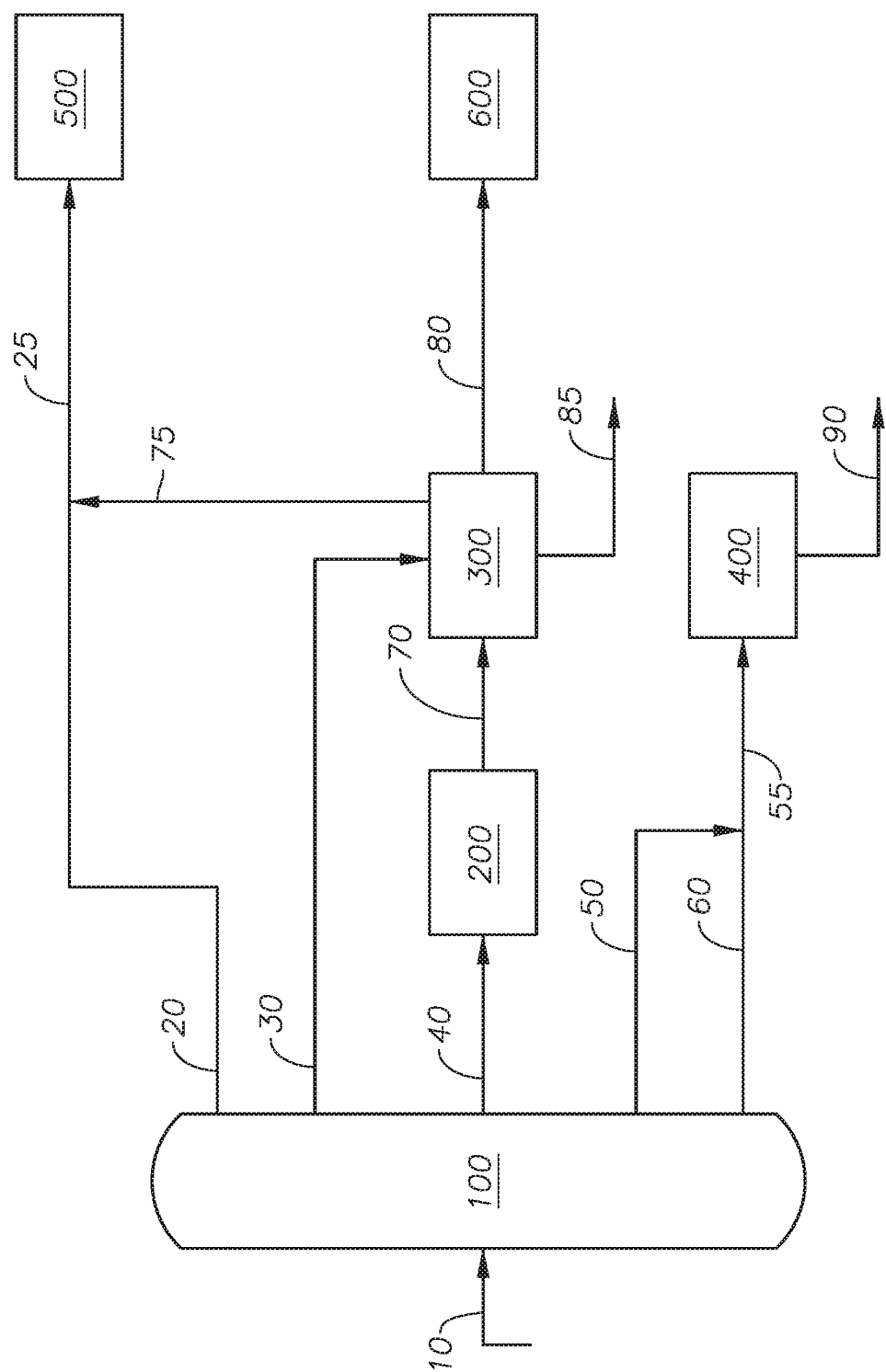
FIG. 6 provides a process diagram of an embodiment of the process.

The Example was conducted by a lab scale unit, according to the process described with reference to FIG. 6. Crude oil 10 was separated in distillation column 100 to produce light gas oil 30. Crude oil 10 was an Arabian Light Crude oil having an API gravity of 35 degrees and a total sulfur content of 1.7 wt %. The volumetric flow rate of crude oil 10 was 400,000 barrels per day (bpd). Distillation column 100 produced light gas oil 30 and light vacuum gas oil 40. Light gas oil 30 was produced with a narrow cut point having a final boiling point between 300 deg C. and 340 deg C., while light vacuum gas oil 40 was produced with a wider cut having a final boiling point 400 deg C. and 430 deg C. Light vacuum gas oil 40 was introduced to supercritical upgrading unit 200 to produce supercritical product oil 70.

Figure 2:
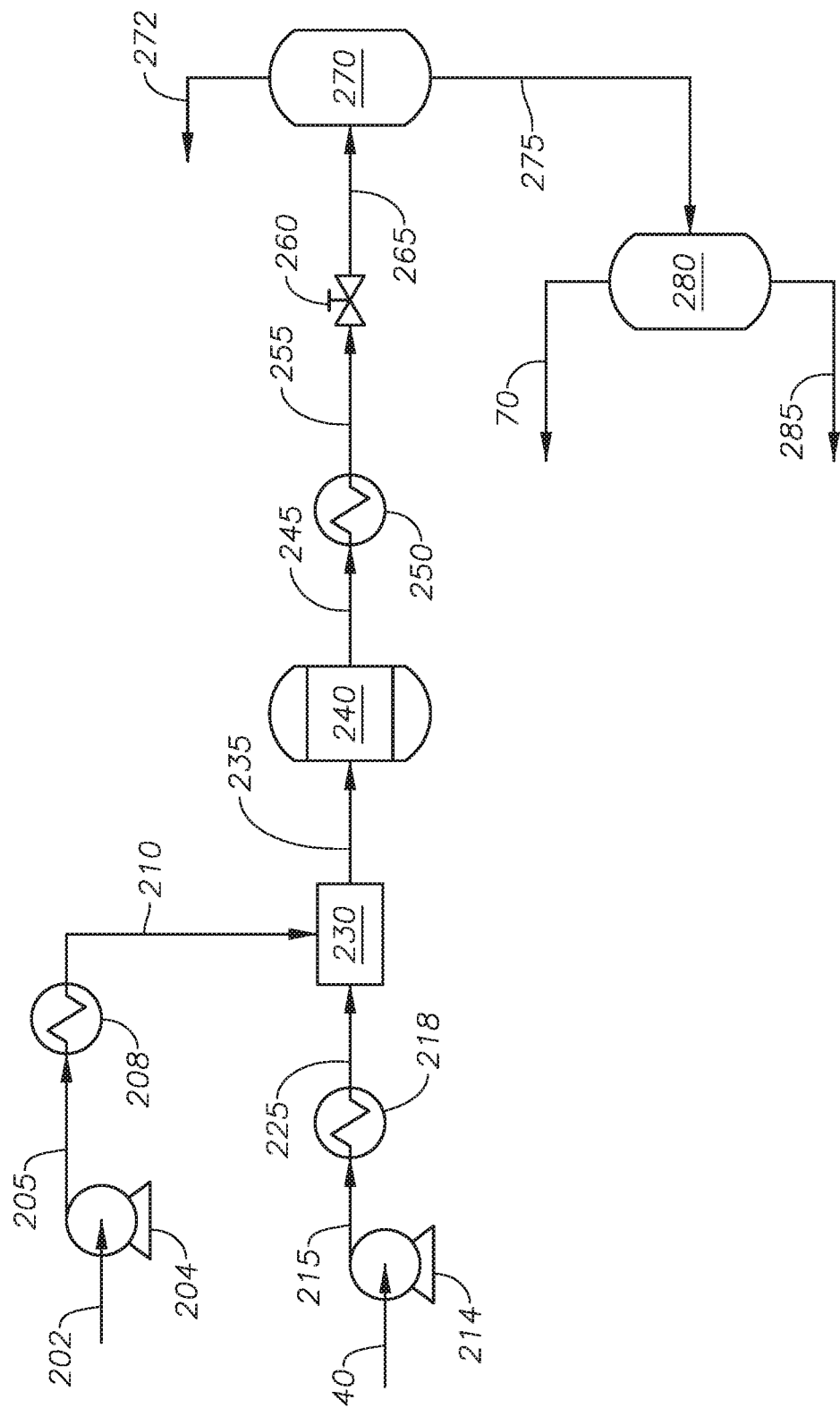
FIG. 2 provides a process diagram of an embodiment of the supercritical upgrading unit.

Supercritical upgrading unit 200, described with reference FIG. 2, was operated as follows. The ratio of the volumetric flow rate of water feed 202 to light vacuum gas oil 40 was 2:1 as measured at standard atmospheric temperature and pressure. The pressure of both pressurized water 205 and pressurized hydrocarbon feed 215 was 3,600 psig. The temperature of supercritical water 210 was 450 deg C. The temperature of hot hydrocarbon stream 225 was 150 deg C. Mixer 230 was a simple tee fitting. Supercritical reactor 240 was operated at 450 deg C. and a residence time of 3.5 minutes. Effluent stream 245 was cooled in cooling device 250 to a temperature of 90 deg C., where cooling device 250 was a shell and tube type cross exchanger that heated water feed 202 and a second shell and tube exchanger. Cooled stream 255 was depressurized in depressurizing device 260 to atmospheric pressure. Modified stream 265 was separated in separator 270 to produce gases stream 272 and liquid stream 275. Liquid stream 275 was separated in oil-water separator 280 to produce supercritical product oil 70 and water product 280.

Supercritical product oil 70 and light gas oil 30 are both introduced to fractionator 300. Fractionator 300 produced upgraded light gas oil 80, upgraded light fraction 75, and upgraded heavy fraction 85. The properties of certain streams are in Table 1.

TABLE 1

| | Properties of various streams. | | | | |
| --- | --- | --- | --- | --- | --- |
| Stream Properties | Example 1 Light gas oil | Example 2 Light gas oil 10 | Example 2 Light Vacuum Gas Oil 40 | Example 2 Supercritical Product Oil 70 | Example 2 Upgraded Light Gas Oil 80 |
| Volume Flow (barrel/day) | 100,824 | 79,852 | 64,986 | 65,667 | 123,580 |
| API (deg) | 37.1 | 39.5 | 28.2 | 34.4 | 39.5 |
| TBP 5% | 210 | 201 | 316 | 273 | 212 |
| TBP 10% | 221 | 212 | 326 | 287 | 223 |
| TBP 30% | 252 | 238 | 35 | 318 | 258 |
| TBP 50% | 281 | 261 | 372 | 344 | 287 |
| TBP 70% | 312 | 284 | 395 | 370 | 312 |
| TBP 90% | 345 | 311 | 421 | 408 | 347 |
| TBP 95% | 357 | 321 | 431 | 416 | 358 |
| Sulfur Content (wt %) | 1.06 | 0.82 | 1.97 | 1.29 | 0.79 |
| Cetane Index, ASTM D4737 | 54.5 | 53.8 | — | — | 55.1 |
| Cloud Point (deg C.) | −5 | −14 | — | — | −12 |

Upgraded light gas oil 80 had a cloud point of −12 deg C., while the T95% was about 360 deg C. The flow rate of upgraded light gas oil 80 was greater than the flow rate of the light gas oil from Example 1.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

There various elements described can be used in combination with all other elements described here unless otherwise indicated.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed here as from about one particular value to about another particular value and are inclusive unless otherwise indicated. When such a range is expressed, it is to be understood that another embodiment is from the one particular value to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these references contradict the statements made here.

As used here and in the appended claims, the words "comprise," "has," and "include" and all grammatical variations thereof are each intended to have an open, non-limiting meaning that does not exclude additional elements or steps.

That which is claimed is:

1. A method for producing a diesel having improved cold flow properties, the method comprising the steps of:
   introducing a crude oil to a distillation column;
   separating the crude oil in the distillation unit to produce a light gas oil, a light vacuum gas oil, and a heavy vacuum gas oil, where the light gas oil has a T95% cut point in the range between 300 deg C. and 340 deg C., where the light vacuum gas oil has a T95% cut point in the range between 400 deg C. and 430 deg C., where the heavy vacuum gas oil has a T95% cut point of greater than 560 deg C.;
   introducing the light vacuum gas oil to a supercritical upgrading unit, wherein the light vacuum gas oil comprises a reduced amount of polycyclic aromatics compared to the heavy vacuum gas oil;
   processing the light vacuum gas oil in the supercritical water unit to produce an upgraded vacuum gas oil;
   introducing the upgraded vacuum gas oil to a fractionator;
   separating the upgraded vacuum gas oil in the fractionator to produce an upgraded light fraction, an upgraded light gas oil, and upgraded heavy fraction;
   introducing the upgraded light gas oil into a diesel pool, where the diesel pool comprises diesel; and
   blending the light gas oil into the diesel pool.

2. The method of claim 1, where the diesel in the diesel pool meets the standards of EN590.

3. The method of claim 1, where the diesel in the diesel pool has a cloud point of less than −3 deg C., further where the diesel has a CFPP of less than −20 deg C., and further where the diesel has a pour point of less than −18 deg C.

4. The method of claim 1, further comprising the steps of:
   separating a light fraction stream in the distillation column, where the light fraction stream has a T95% cut point of less than 240 deg C., where the light fraction stream comprises naphtha and kerosene;
   mixing the upgraded light fraction with the light fraction stream to produce a mixed light stream; and
   introducing the mixed light stream to a naphtha and kerosene pool.

5. The method of claim 1, further comprising the steps of:
   separating a vacuum residue stream in the distillation column, where the vacuum residue stream has a T5% cut point of greater than 560 deg C.;
   mixing the heavy vacuum gas oil and the vacuum residue stream to produce a mixed heavy stream; and
   introducing the mixed heavy stream to a resid upgrading unit.

6. The method of claim 5, where the resid upgrading unit is selected from the group consisting of fluid catalytic cracking (FCC) unit, resid FCC, hydrocracker, resid hydrodesulfurization (RHDS) hydrotreater, visbreaker, coker, gasifier, and solvent extractor.

7. The method of claim 5, further comprising the steps of:
   separating a residue slip stream from the vacuum residue stream, where the residue slip stream comprises a vacuum residue fraction, wherein the vacuum residue fraction comprises aliphatic sulfur;
   mixing the residue slip stream with the light vacuum gas oil to produce mixed vacuum gas oil stream such that the amount of vacuum residue fraction in the mixed vacuum gas oil stream is between 0.1 wt% and 10 wt%; and
   introducing mixed vacuum gas oil to the supercritical upgrading unit.

8. The method of claim 1, where the step of processing the light vacuum gas oil in the supercritical water unit comprises the steps of:
   increasing the pressure of the light vacuum gas oil in a hydrocarbon pump to produce a pressurized hydrocarbon feed, where the pressure of the pressurized hydrocarbon feed is greater than the critical pressure of water;
   increasing the temperature of pressurized hydrocarbon feed in a hydrocarbon heater to produce a hot hydrocarbon stream, where the temperature of the hot hydrocarbon stream is between 10 deg C. and 300 deg C.;
   mixing the hot hydrocarbon stream with a supercritical water in a mixer to produce a mixed feed stream;
   introducing the mixed feed stream to a supercritical reactor, where the temperature in the supercritical reactor is in the range between 380 deg C. and 600 deg C. and the pressure in the supercritical reactor is in the range between 3203 psig and 5150 psig, where the residence time in the supercritical reactor is in the range between 10 seconds and 60 minutes;
   allowing conversion reactions in the supercritical reactor to produce an effluent stream such that the mixed feed stream undergoes conversion reactions;
   reducing the temperature of the effluent stream in a cooling device to produce a cooled stream, where the cooled stream is at a temperature in the range between 10 deg C. and 200 deg C.;
   reducing the pressure of the cooled stream in a depressurizing device to produce a modified stream, where the pressure of modified stream is in the range between 0 psig and 300 psig;
   introducing the modified stream to a separator;

separating the modified stream in the separator to produce a gases stream and a liquid stream;
introducing the liquid stream to an oil-water separator; and
separating the liquid stream in the oil-water separator to produce the upgraded vacuum gas oil and a water product.

9. The method of claim 1, where the distillation column is in the absence of an external supply of catalyst, further where the supercritical upgrading unit is in the absence of an external supply of catalyst, and further where the fractionator is in the absence of an external supply of catalyst.

10. The method of claim 1, where the distillation column is in the absence of an external supply of hydrogen, further where the supercritical upgrading unit is in the absence of an external supply of hydrogen, and further where the fractionator is in the absence of an external supply of hydrogen.

11. A method for producing a diesel having improved cold flow properties, the method comprising the steps of:
introducing a crude oil to a distillation column;
separating the crude oil in the distillation unit to produce a light gas oil, a light vacuum gas oil, and a heavy vacuum gas oil, where the light gas oil has a T95% cut point in the range between 300 deg C. and 340 deg C. such that the light gas oil is in the absence of refactory sulfur compounds, where the light vacuum gas oil has a T95% cut point in the range between 400 deg C. and 430 deg C., where the heavy vacuum gas oil has a T95% cut point of greater than 560 deg C., where the light vacuum gas oil comprises a reduced amount of polycyclic aromatics compared to the heavy vacuum gas oil;
introducing the light gas oil to a gas oil hydrodesulfurization unit, where the gas oil hydrodesulfurization unit operates at a temperature in the range between 300 deg C. and 420 deg C., where the gas oil hydrodesulfurization unit operates at a pressure between 100 psig and 1050 psig, where the gas oil hydrodesulfurization unit operates at a liquid hourly space velocity between 0.5 h−1 and 6 h−1, where the gas oil hydrodesulfurization unit comprises a hydrodesulfurization catalyst;
processing the light gas oil in the gas oil hydrodesulfurization unit to produce a desulfurized light gas oil, wherein the desulfurized light gas oil comprises less than 10 ppm wt sulfur;
introducing the light vacuum gas oil to a supercritical upgrading unit;
processing the light vacuum gas oil in the supercritical water unit to produce an upgraded vacuum gas oil;
introducing the upgraded vacuum gas oil to an upgrading hydrodesulfurization unit, where the upgrading hydrodesulfurization unit operates at a temperature in the range between 300 deg C. and 420 deg C., where the upgrading hydrodesulfurization unit operates at a pressure between 100 psig and 1050 psig, where the upgrading hydrodesulfurization unit operates at a liquid hourly space velocity between 0.5 h−1 and 6 h−1, where the upgrading hydrodesulfurization unit comprises a hydrodesulfurization catalyst;
processing the upgraded vacuum gas oil in the upgrading hydrodesulfurization unit to produce a desulfurized vacuum gas oil;
introducing the desulfurized vacuum gas oil to a fractionator;
separating the desulfurized vacuum gas oil in the fractionator to produce an upgraded light fraction, an upgraded light gas oil, and upgraded heavy fraction;
introducing the upgraded light gas oil into a diesel pool, where the diesel pool comprises diesel; and
blending the desulfurized light gas oil into the diesel pool.

12. The method of claim 11, where the diesel in the diesel pool meets the standards of EN590.

13. The method of claim 11, where the diesel in the diesel pool has a cloud point of less than −3 deg C., further where the diesel has a CFPP of less than −20 deg C., and further where the diesel has a pour point of less than −18 deg C.

14. The method of claim 11, further comprising the steps of:
separating a light fraction stream in the distillation column, where the light fraction stream has a T95% cut point of less than 240 deg C., where the light fraction stream comprises naphtha and kerosene;
mixing the upgraded light fraction with the light fraction stream to produce a mixed light stream; and
introducing the mixed light stream to a naphtha and kerosene pool.

15. The method of claim 11, further comprising the steps of:
separating a vacuum residue stream in the distillation column, where the vacuum residue stream has a T5% cut point of greater than 560 deg C.;
mixing the heavy vacuum gas oil and the vacuum residue stream to produce a mixed heavy stream; and
introducing the mixed heavy stream to a reside upgrading unit.

16. The method of claim 15, where the resid upgrading unit is selected from the group consisting of fluid catalytic cracking (FCC) unit, resid FCC, hydrocracker, resid hydrodesulfurization (RHDS) hydrotreater, visbreaker, coker, gasifier, and solvent extractor.

17. The method of claim 15, further comprising the steps of:
separating a residue slip stream from the vacuum residue stream, where the residue slip stream comprises a vacuum residue fraction, wherein the vacuum residue fraction comprises aliphatic sulfur;
mixing the residue slip stream with the light vacuum gas oil to produce mixed vacuum gas oil stream such that the amount of vacuum residue fraction in the mixed vacuum gas oil stream is between 0.1 wt% and 10 wt%; and
introducing mixed vacuum gas oil to the supercritical upgrading unit.

18. The method of claim 11, where the step of processing the light vacuum gas oil in the supercritical water unit comprises the steps of:
increasing the pressure of the desulfurized light vacuum gas oil in a hydrocarbon pump to produce a pressurized hydrocarbon feed, where the pressure of the pressurized hydrocarbon feed is greater than the critical pressure of water;
increasing the temperature of pressurized hydrocarbon feed in a hydrocarbon heater to produce a hot hydrocarbon stream, where the temperature of the hot hydrocarbon stream is between 10 deg C. and 300 deg C.;
mixing the hot hydrocarbon stream with a supercritical water in a mixer to produce a mixed feed stream;
introducing the mixed feed stream to a supercritical reactor, where the temperature in the supercritical reactor is in the range between 380 deg C. and 600 deg C. and the pressure in the supercritical reactor is in the range between 3203 psig and 5150 psig, where the residence time in the supercritical reactor is in the range between 10 seconds and 60 minutes;

allowing conversion reactions in the supercritical reactor to produce an effluent stream such that the mixed feed stream undergoes conversion reactions;

reducing the temperature of the effluent stream in a cooling device to produce a cooled stream, where the cooled stream is at a temperature in the range between 10 deg C. and 200 deg C.;

reducing the pressure of the cooled stream in a depressurizing device to produce a modified stream, where the pressure of modified stream is in the range between 0 psig and 300 psig;

introducing the modified stream to a separator;

separating the modified stream in the separator to produce a gases stream and a liquid stream;

introducing the liquid stream to an oil-water separator; and separating the liquid stream in the oil-water separator to produce the upgraded vacuum gas oil and a water product.

19. The method of claim 11, where the distillation column is in the absence of an external supply of catalyst, further where the supercritical upgrading unit is in the absence of an external supply of catalyst, and further where the fractionator is in the absence of an external supply of catalyst.

20. The method of claim 11, where the distillation column is in the absence of an external supply of hydrogen, further where the supercritical upgrading unit is in the absence of an external supply of hydrogen, and further where the fractionator is in the absence of an external supply of hydrogen.

* * * * *